United States Patent
Gerhard et al.

(10) Patent No.: US 9,170,987 B2
(45) Date of Patent: Oct. 27, 2015

(54) STYLE EXTENSIBILITY APPLIED TO A GROUP OF SHAPES BY EDITING TEXT FILES

(75) Inventors: Lutz Gerhard, Seattle, WA (US); Janet L. Schorr, Seattle, WA (US); Thomas C. Underhill, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 718 days.

(21) Appl. No.: 11/335,009

(22) Filed: Jan. 18, 2006

(65) Prior Publication Data
US 2007/0168858 A1    Jul. 19, 2007

(51) Int. Cl.
*G06F 17/00* (2006.01)
*G06F 17/21* (2006.01)

(52) U.S. Cl.
CPC .................................. *G06F 17/211* (2013.01)

(58) Field of Classification Search
CPC .................................................... G06F 17/211
USPC ......................................... 715/210, 209, 205
See application file for complete search history.

(56) References Cited

U.S. PATENT DOCUMENTS

| | | | |
|---|---|---|---|
| 4,078,249 A | | 3/1978 | Lelke et al. |
| 4,254,416 A | | 3/1981 | Lelke |
| 4,339,886 A | | 7/1982 | Griffiths et al. |
| 5,844,559 A | * | 12/1998 | Guha ............................ 715/846 |
| 6,014,146 A | | 1/2000 | Freeman |
| 6,023,714 A | * | 2/2000 | Hill et al. ....................... 715/235 |
| 6,105,044 A | * | 8/2000 | DeRose et al. ................. 715/234 |
| 6,175,843 B1 | * | 1/2001 | Muramoto et al. ............ 715/236 |
| 6,589,292 B1 | | 7/2003 | Langford-Wilson |
| 6,671,680 B1 | * | 12/2003 | Iwamoto et al. .................. 707/3 |
| 6,822,650 B1 | | 11/2004 | Davis et al. |
| 6,826,727 B1 | * | 11/2004 | Mohr et al. .................... 715/235 |
| 6,868,525 B1 | * | 3/2005 | Szabo ............................ 715/738 |
| 6,985,898 B1 | * | 1/2006 | Ripley et al. .......................... 1/1 |
| 7,058,890 B2 | * | 6/2006 | George et al. ................. 715/728 |

(Continued)

FOREIGN PATENT DOCUMENTS

EP    0 332 557 A2    9/1989

OTHER PUBLICATIONS

Galli, R., "Data Consistency Methods for Collaborative 3D Editing," Universitat de les Illes Balears, Ph.D. Thesis, 235 pages (2000).

(Continued)

*Primary Examiner* — Stephen Hong
*Assistant Examiner* — Marshon Robinson
(74) *Attorney, Agent, or Firm* — Steve Crocker; Danielle Johnston-Holmes; Micky Minhas

(57) ABSTRACT

Style extensibility is provided to shapes in a diagram by editing text files. A structured data model is used to render the diagram representing items provided by the user in a text-based format such as a bulleted list. A style engine determines style properties for style labels assigned to key shapes of the diagram. Style properties include features associated with the shapes and their content that preserve an overall look-and-feel of the diagram. Color scheme(s) are also provided through the style labels. A layout engine uses layout definitions based on user input and default parameters along with style label assignments to render a presentation model. Style properties may be modified and new styles added after the diagram is rendered.

15 Claims, 9 Drawing Sheets

(56) References Cited

U.S. PATENT DOCUMENTS

| | | | |
|---|---|---|---|
| 7,213,199 B2 * | 5/2007 | Humenansky | 715/209 |
| 7,873,916 B1 * | 1/2011 | Chaudhri | 715/823 |
| 2002/0019974 A1 * | 2/2002 | Iizuka | 717/107 |
| 2002/0038349 A1 * | 3/2002 | Perla et al. | 709/217 |
| 2002/0078086 A1 * | 6/2002 | Alden et al. | 707/503 |
| 2002/0103835 A1 * | 8/2002 | Kearney | 707/530 |
| 2002/0103869 A1 * | 8/2002 | Goatly et al. | 709/206 |
| 2003/0066058 A1 | 4/2003 | Van De Vanter | |
| 2003/0098880 A1 * | 5/2003 | Reddy et al. | 345/763 |
| 2003/0151633 A1 * | 8/2003 | George et al. | 345/864 |
| 2004/0204979 A1 * | 10/2004 | Eisenberg et al. | 705/10 |
| 2004/0243930 A1 * | 12/2004 | Schowtka et al. | 715/513 |
| 2004/0250200 A1 * | 12/2004 | Chung et al. | 715/500 |
| 2005/0091590 A1 * | 4/2005 | Morita | 715/522 |
| 2005/0102628 A1 | 5/2005 | Salesin et al. | |
| 2006/0277060 A1 * | 12/2006 | Antognini | 705/1 |

OTHER PUBLICATIONS

Rodham, K. et al., "Smart Telepointers: Maintaing Telepointer Consistency in the Presence of User Interface Customization," *ACM Transactions on Graphics*, vol. 13, No. 3, pp. 300-307 (Jul. 1994).

* cited by examiner

STYLE EXTENSIBILITY APPLIED TO A GROUP OF SHAPES BY EDITING TEXT FILES

BACKGROUND

Diagrams that graphically present relations between objects are used in many applications including, but not limited to, word processing applications, presentation applications, spreadsheet applications, and the like. Organizational structures, network structures, and the like may be visually represented by a diagram. Diagrams may include simple or complex objects and connect those objects in many different ways. Traditional systems for applying style to a complex object may not allow developers or advanced users to add style descriptions to the application during use. Some applications may allow for adding styles to existing charts or layouts during setup, but those still do not allow adding styles for future layouts that do not exist at the time of the creation of the style.

SUMMARY

Style extensibility is provided to shapes in a diagram by editing text files. A structured data model may be used to render the diagram representing items and their relationships provided by a user in a semantic model. Style properties are assigned to key shapes of the diagram through style labels. Style definitions may also assign color scheme(s) through the style labels. Layout definitions based on user input and default parameters along with style labels are employed to render a presentation model from a semantic model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
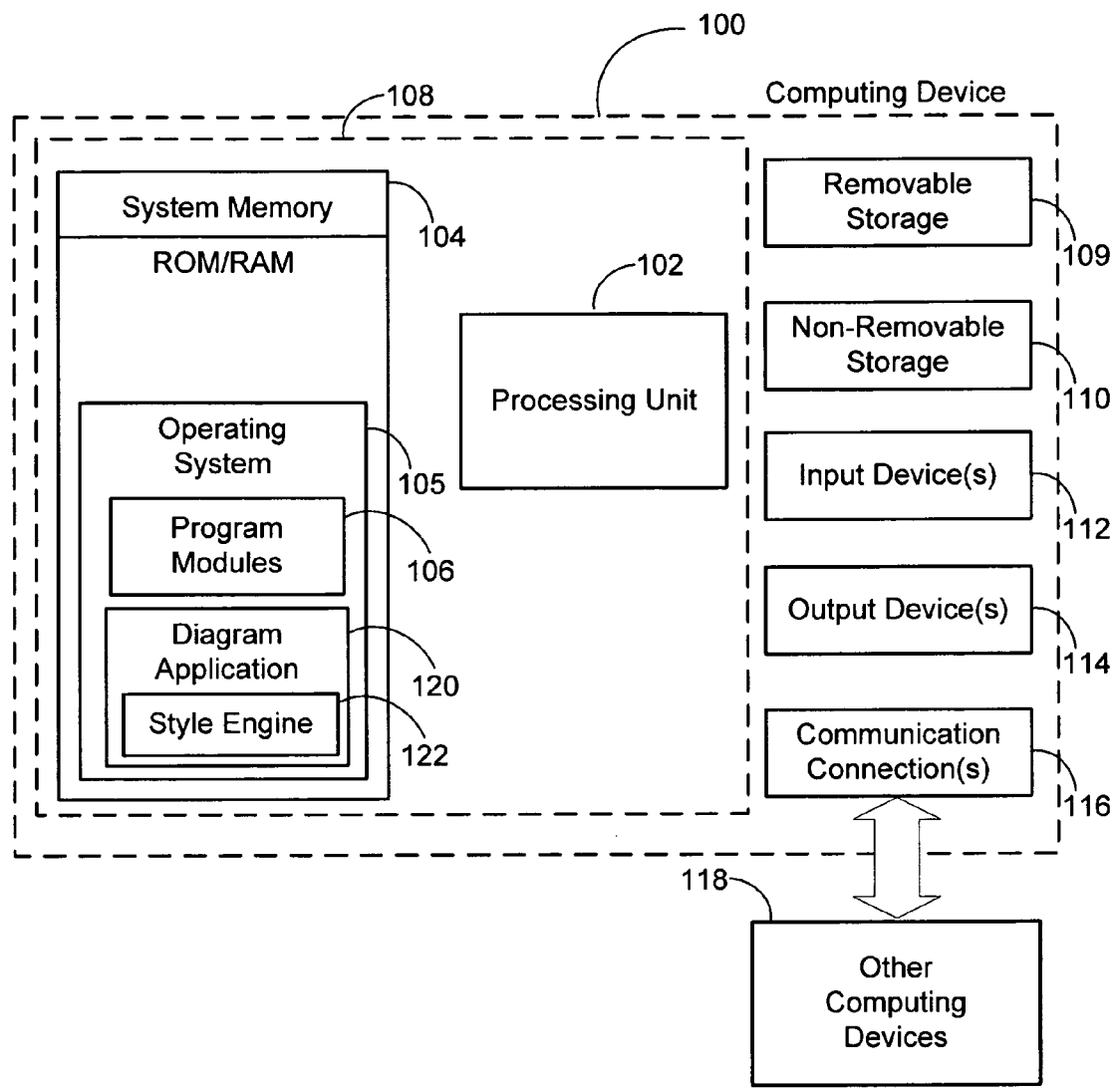
FIG. 1 illustrates a computing device in which a diagram application may be executed applying style extensibility to a group of shapes by editing text files.

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes operating system 105 and one or more program modules 106 working within operating system 105.

In addition to program modules 106, diagram application 120 may also be executed within operating system 105. Diagram application 120 may include a word processing application, a presentation application, a spreadsheet application, an electronic mail application, and the like, with diagram capability. Diagram capability refers to a feature of the application providing a diagram independently or as part of another document such as a text-document based on user input.

Diagram application 120 may include style engine 122, a layout engine (not shown) and other modules that interact in order to determine style and other properties of diagram elements (e.g. objects and connectors) and lay out the diagram. To perform the actions described above, diagram application 120 may include and/or interact with other computing devices, applications, and application interfaces (APIs) residing in other applications.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, etc. Output device(s) 114 such as a display, speakers, printer, etc. may also be included. To execute an inking application computing device 100 typically includes a touch-sensitive display that detects ink strokes from an inking pen or stylus, essentially acting as an input device.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
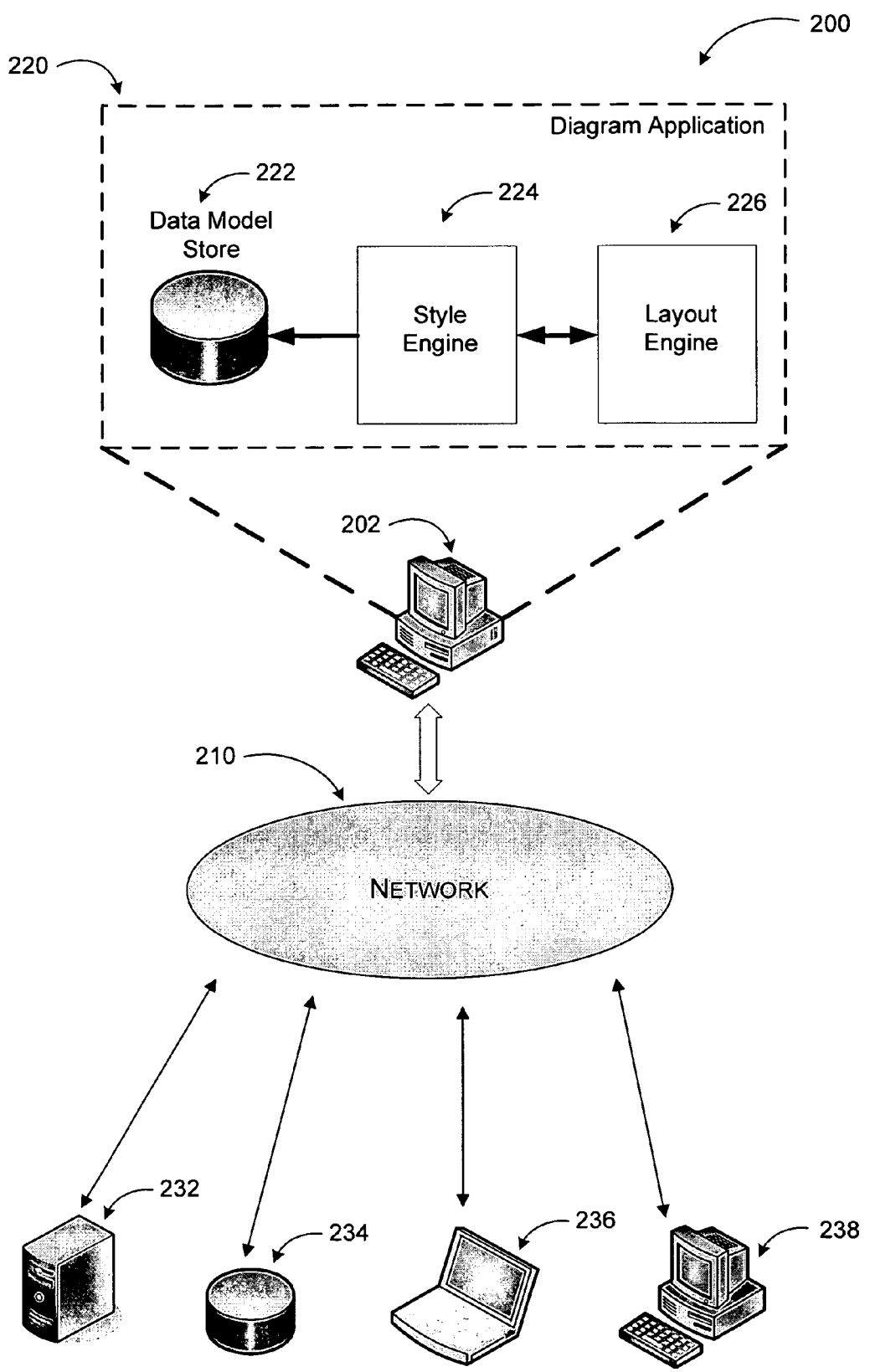
FIG. 2 illustrates a system, where example embodiments of a diagram application may be implemented.

FIG. 2 illustrates system 200, where example embodiments of a diagram application may be implemented. System 200 may comprise any topology of servers, clients, Internet service providers, and communication media. Also, system 200 may have a static or dynamic topology.

Diagram application 220 may be executed on computing device 202 providing a diagram based on user input. Diagram application 220 may be run centrally on computing device 202 or in a distributed manner over several computing devices managed by one or more servers (e.g. server 232). Computing device 202 may communicate with other computing devices such as laptop PC 236, desktop PC 238, and the like, over network 210 as part of the operation of diagram application 220.

Moreover, any computing device associated with the diagram application may store data at or receive data from data store 234. In an example embodiment, diagram application 220 may include style engine 224 and layout engine 226 that interact in assigning style labels and color schemes to key shapes of a diagram. Style elements, color elements, and other information may be stored in and retrieved from data model store 222. In another embodiment, diagram application 220 may be executed in a distributed manner and data model and other elements may be stored in data store 234.

Network 210 may be a secure network such as an enterprise network, or an unsecure network such as a wireless open network. Network 210 provides communication between the nodes described above. By way of example, and not limitation, network 210 may include wired media such as a wired network or direct-wired connection, and wireless media such as acoustic, RF, infrared and other wireless media.

Many other configurations of computing devices, applications, data sources, and systems may be employed to implement style extensibility applied to a group of shapes by editing text files.

Figure 3:
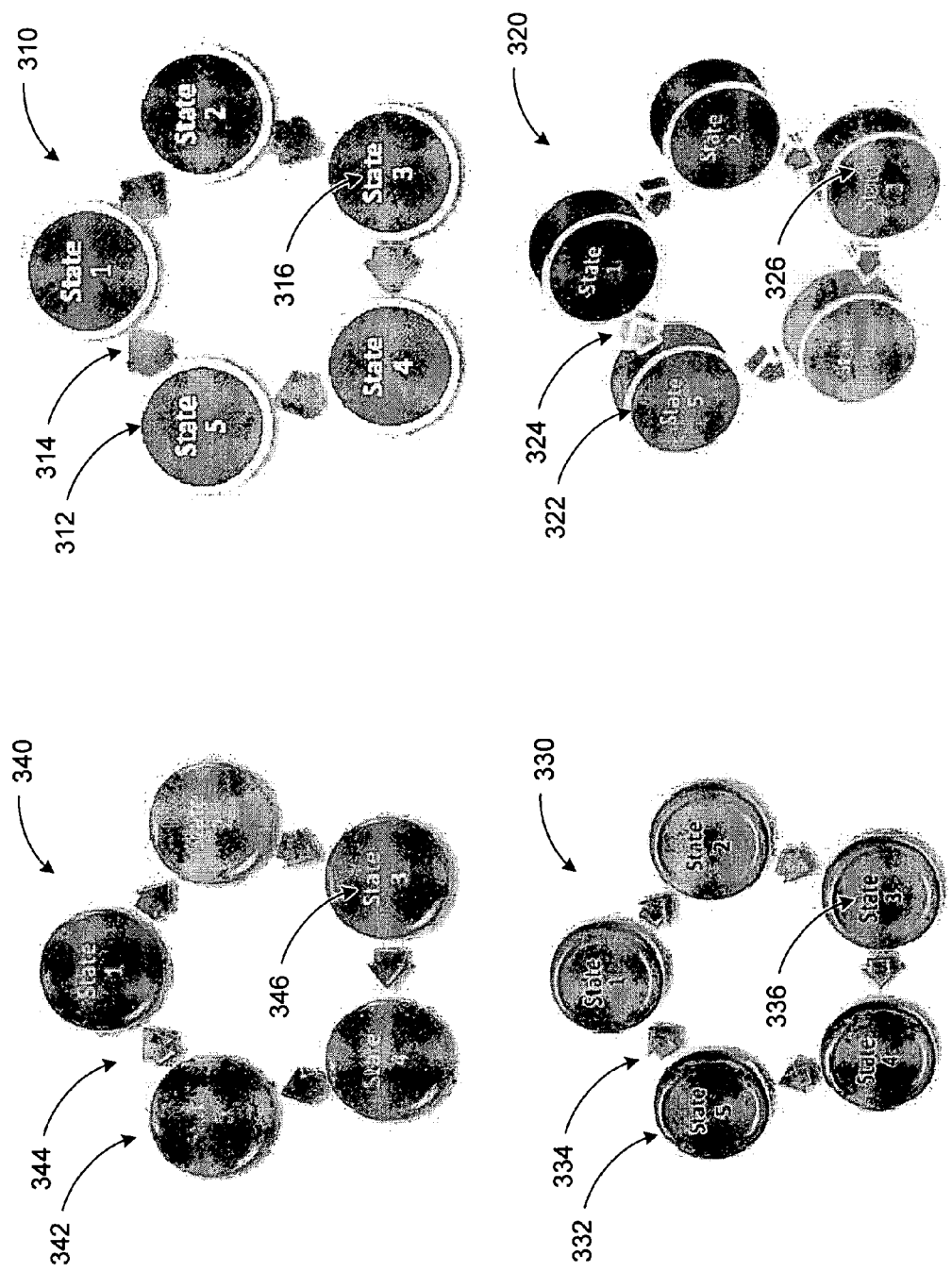
FIG. 3 illustrates a set of example diagrams with style extensibility.

FIG. 3 illustrates a set of example diagrams with style extensibility. As described before, a diagram application may be an independent application or a part of a word processing application, a presentation application, a spreadsheet application, and the like. A diagram application according to embodiments may receive user input in form of selection of shapes (elements of the diagram), a text-based entry of relationships between diagram elements (e.g. a bulleted list), and the like. The diagram application may then lay out the diagram presenting the user-defined relationships between the elements and the style and color scheme specified by the user.

A method and data model according to aspects described herein enables a user or a programmer to create a style definition for a layout definition, as long as the layout definition and the style definitions follow a set of rules. Using the set of rules ensures any new or existing style definition's compatibility with any new or existing layout definition. A consistent look-and-feel between possible layouts is also provided.

The layout and style definitions are based on a data model that ensures that the underlying layout is built upon data that is structured. The structure of the data is hierarchical and directional.

The layout definitions may contain variables called style labels, which are used to identify key shapes in a layout that are then matched and specified by the style definition. The use of the style labels is consistent with the use of the style labels in the style definition.

Referring to FIG. 3, example diagram 310 represents enumerated states in a process in a circular diagram. Objects (e.g. object 312) represent individual states. Each object includes text (e.g. content 316) identifying the state represented by the object. Content 316 is not limited to text. It may also include graphics, image(s), or combination of those. The objects are connected by connectors (e.g. connector 314), which indicate a direction of the process.

A style, size, and direction of the connectors along with a size, shape, and positioning of the objects represents the relationship between the elements of the diagram. For example, in an organizational structure diagram, size and direction of connectors may indicate a hierarchy and type of relationship between members, while size, shape, and positioning of the objects may further indicate a position of each member in the organizational hierarchy.

As mentioned previously, a user may be provided the ability to select a style and color scheme for the diagram. By assigning style labels that define certain properties and color schemes of the shapes independently from the layout definition, a look-and-feel of the diagram may be preserved while changing to a different presentation.

Diagram 320 is a different style representation of diagram 310. Objects in diagram 320 (e.g. object 322) are in 3D form as well as connectors (e.g. connector 324). Font type of text (e.g. content 326) is preserved while a different color scheme is used for the objects, connectors and content.

Diagram 330 is yet another style representation of diagram 310. The objects (e.g. object 332) and the connectors (e.g. connector 334) are in button style (concave 3D with contours). Select attributes of shapes, connectors, and content, such as font type, shadowing, 3D/2D presentation, outlining, and the like may be determined by the style definition independent of the layout definition.

Diagram 340 shows a further style representation of diagram 310 with objects and connectors (e.g. object 324 and connector 344) in convex 3D style. A different color scheme is also used. While text is shown in light color in all of the objects, a different color scheme may also be selected for the text (e.g. content 346).

Figure 4:
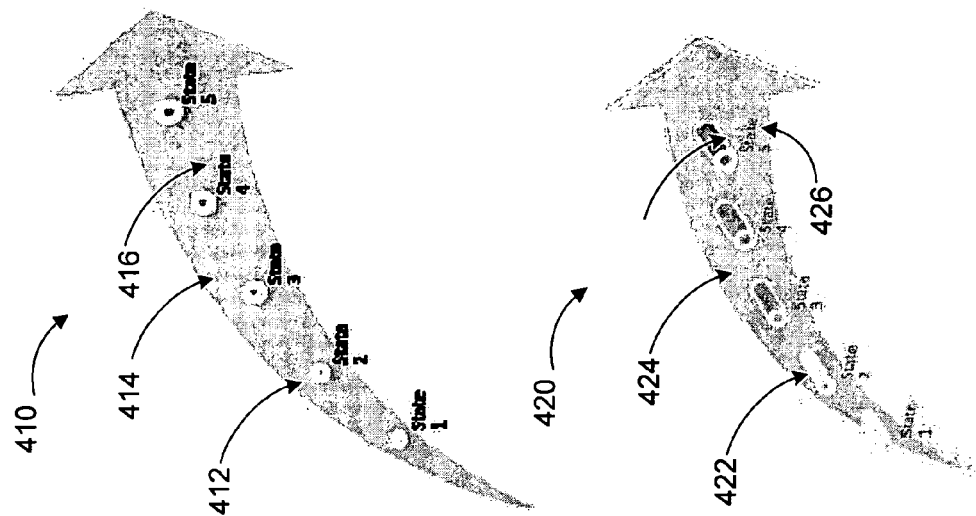
FIG. 4 illustrates another set of example diagrams with style extensibility.
Figure 4:
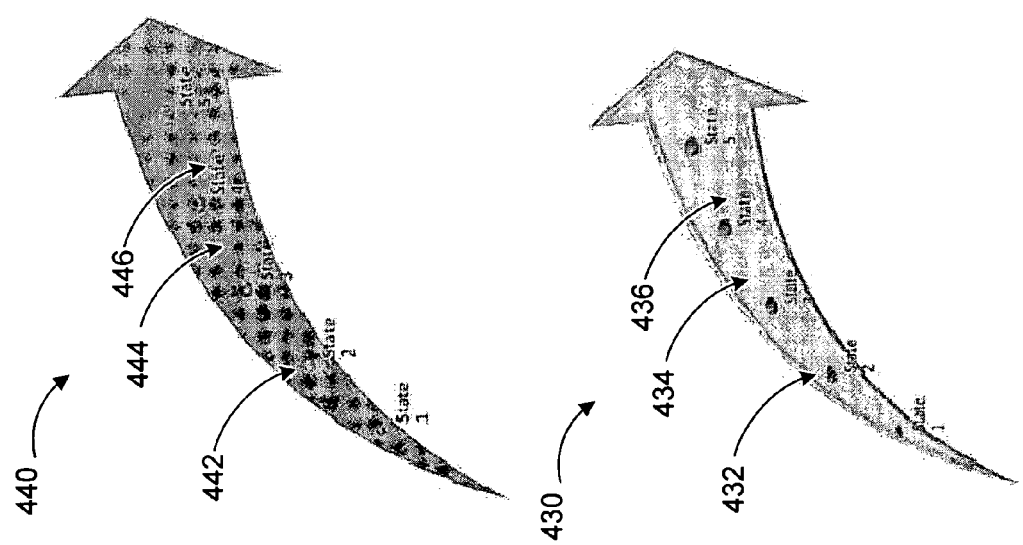

FIG. 4 illustrates another set of example diagrams with style extensibility. In diagrams 410, 420, 430, and 440, the states of the example process of FIG. 3 are shown in an arrow presentation instead of a cycle presentation. Objects (e.g. object 412, 422, 432, 442) are placed on a single connector (e.g. connector 414, 424, 434, and 444 respectively). Content (e.g. content 416, 426, 436, and 446) are placed next to the objects on each connector arrow.

Different styles are implemented in each diagram with varying color schemes 2D or 3D effects, and outlining techniques. While FIGS. 3 and 4 show different diagram styles of similar presentation, layouts may also be modified as between the two figures. Other layout types such as rectangular presentation, radial presentation, and the like may be implemented with style extensibility using the principles described herein.

Figure 5:
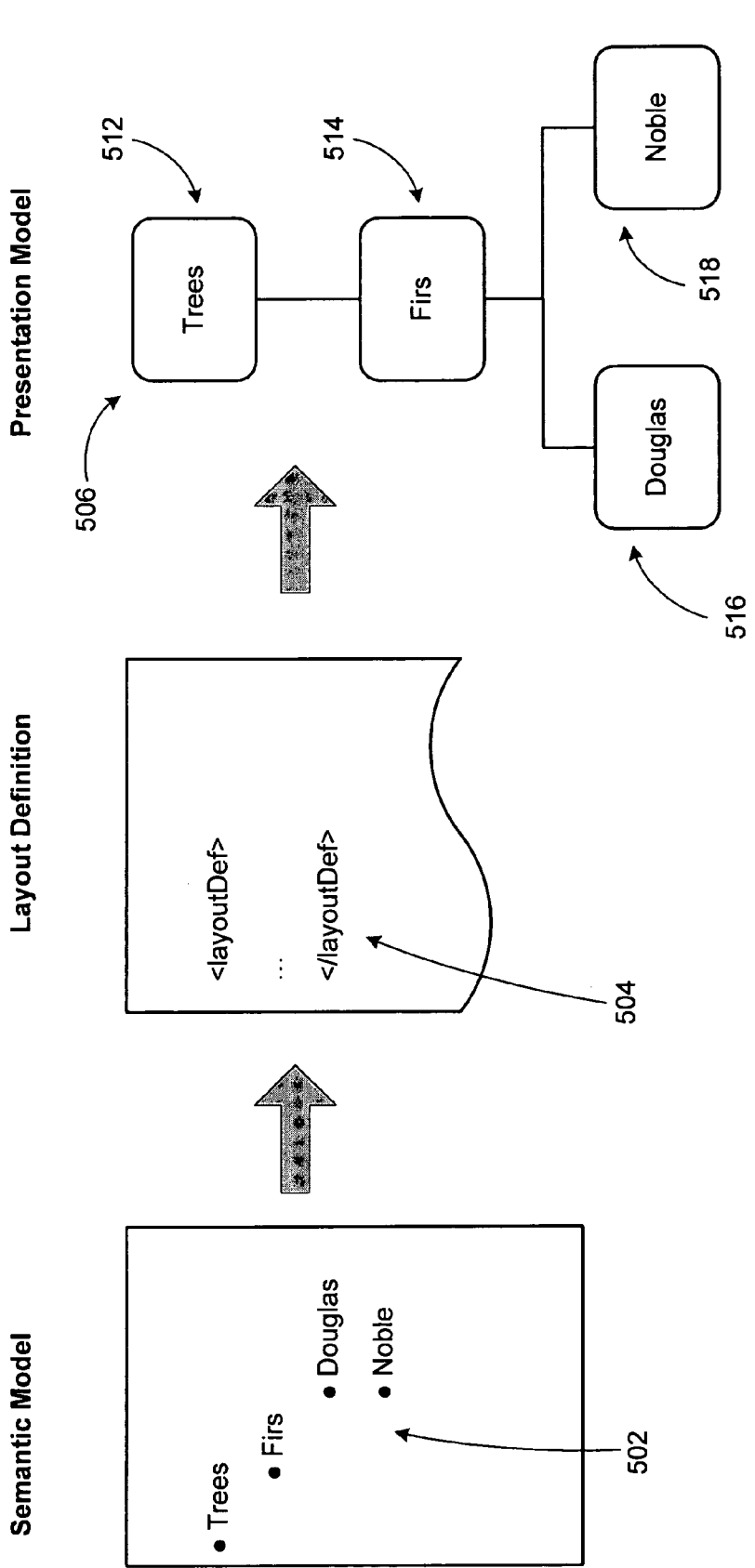
FIG. 5 illustrates an example generation of a presentation model from a semantic model using layout definition.

FIG. 5 illustrates an example generation of a presentation model from a semantic model using layout definition.

As shown in diagram 500, semantic model 502 defines hierarchical relationships between the elements of the diagram. There may be various ways of providing that hierarchy information. According to one embodiment, the user enters the information in a text-based form such as a bulleted list. Each line in the list indicates an object to the placed on the diagram, whereas tabs in each line determine a hierarchical status of each object. For example, semantic model 502 includes four elements with three tab levels (the last two elements being at the same tab level). In a tree-style diagram, such as presentation model 506, each tab level may correspond to a branch level.

Layout definition 504 includes information associated with converting the semantic model to a presentation model. Such information may include shapes to be assigned to text entries in the semantic model, diagram type (e.g. radial, tree, circular), connection types (e.g. arrows), color scheme, and style of the elements.

Once a layout engine (part of the diagram application) applies the layout definition, presentation model 506 is created. In the example diagram, presentation model 506 is in tree style. Accordingly, first entry "Trees" is assigned to a top level shape (object 512), second entry "Firs" is assigned to a second level shape (object 514), and third and fourth entries "Douglas" and "Noble" are assigned to objects 516 and 518 at the third hierarchical level.

In rendering the presentation model from the semantic model, the layout engine interacts with a style engine receiving information associated with style and color of the elements. By rendering the style and color properties independent from the layout definitions, a consistent look-and-feel between possible layouts may be provided. Furthermore, style definitions and color schemes may be modified at any time independent of the rendering of the diagram. New style definitions and color schemes may even be added.

Figure 6:
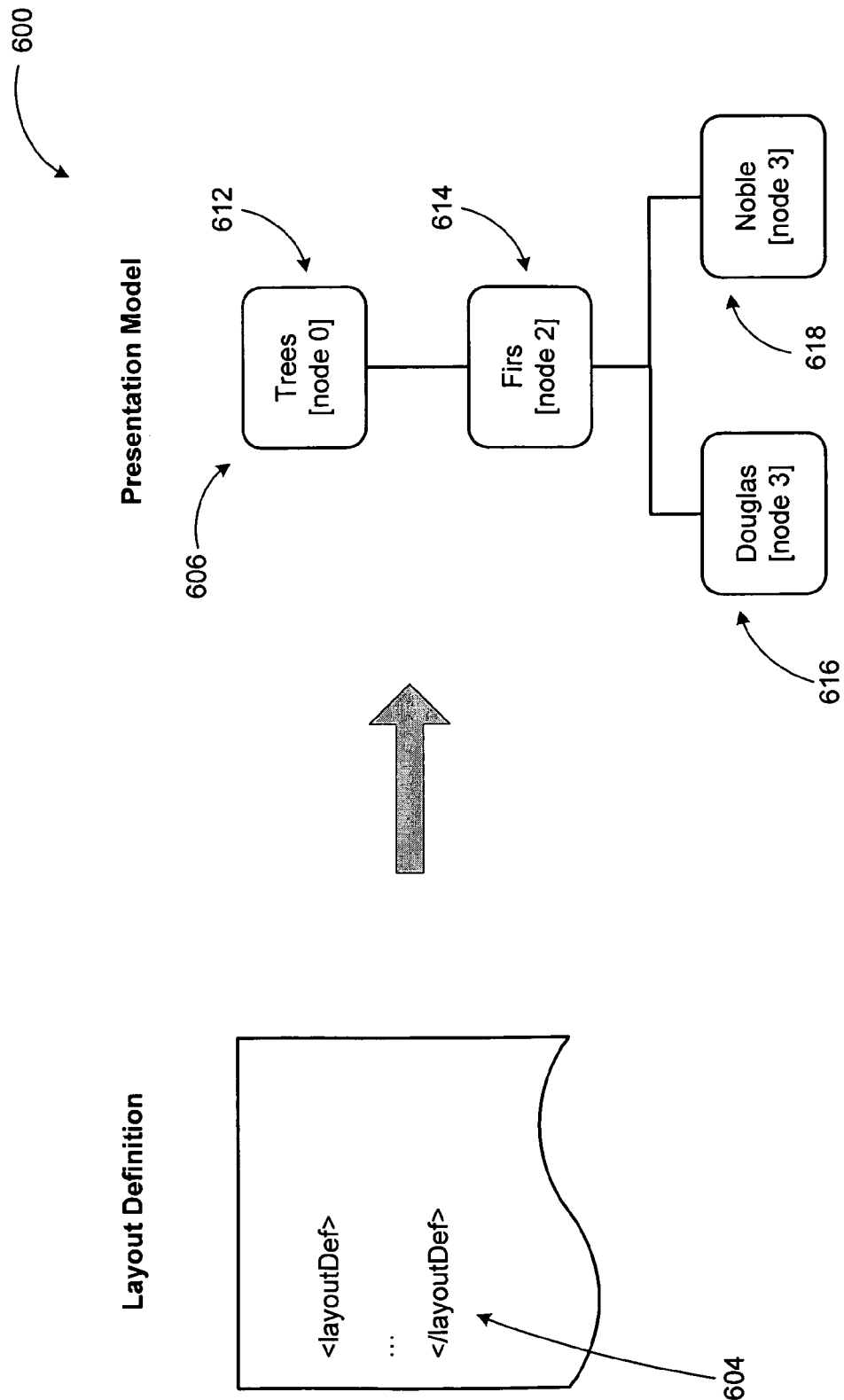
FIG. 6 illustrates identification of key shapes in the presentation model of FIG. 5 by the layout definition.

FIG. 6 illustrates identification of key shapes in the presentation model of FIG. 5 by the layout definition.

Diagram 600 shows how key shapes are assigned identifiers (style labels) that are used to decouple layout definitions and style definitions. Layout definition 604 is still employed to render presentation model 606. But in this case, objects at each hierarchy level are assigned a style label. For example, object 612 at the top level is node 0, object 614 at the second level is node 2, objects 614 and 616 at the third level are assigned style label node 3.

The style labels are used to associate the key shapes with specific style definitions independent of the layout definition. Once the style labels are assigned, a look-and-feel of the presentation of the objects may be preserved even if the layout is modified, as shown in FIGS. 3 and 4.

Style labels may be assigned to any element of a diagram including, but not limited to, objects, connectors, and content. Moreover, embodiments are not limited to the example presentation model shown in FIGS. 5 and 6. Style extensibility by employing style definitions independent from layout definition(s) may be implemented with any type of diagram using the principles described herein.

Figure 7:
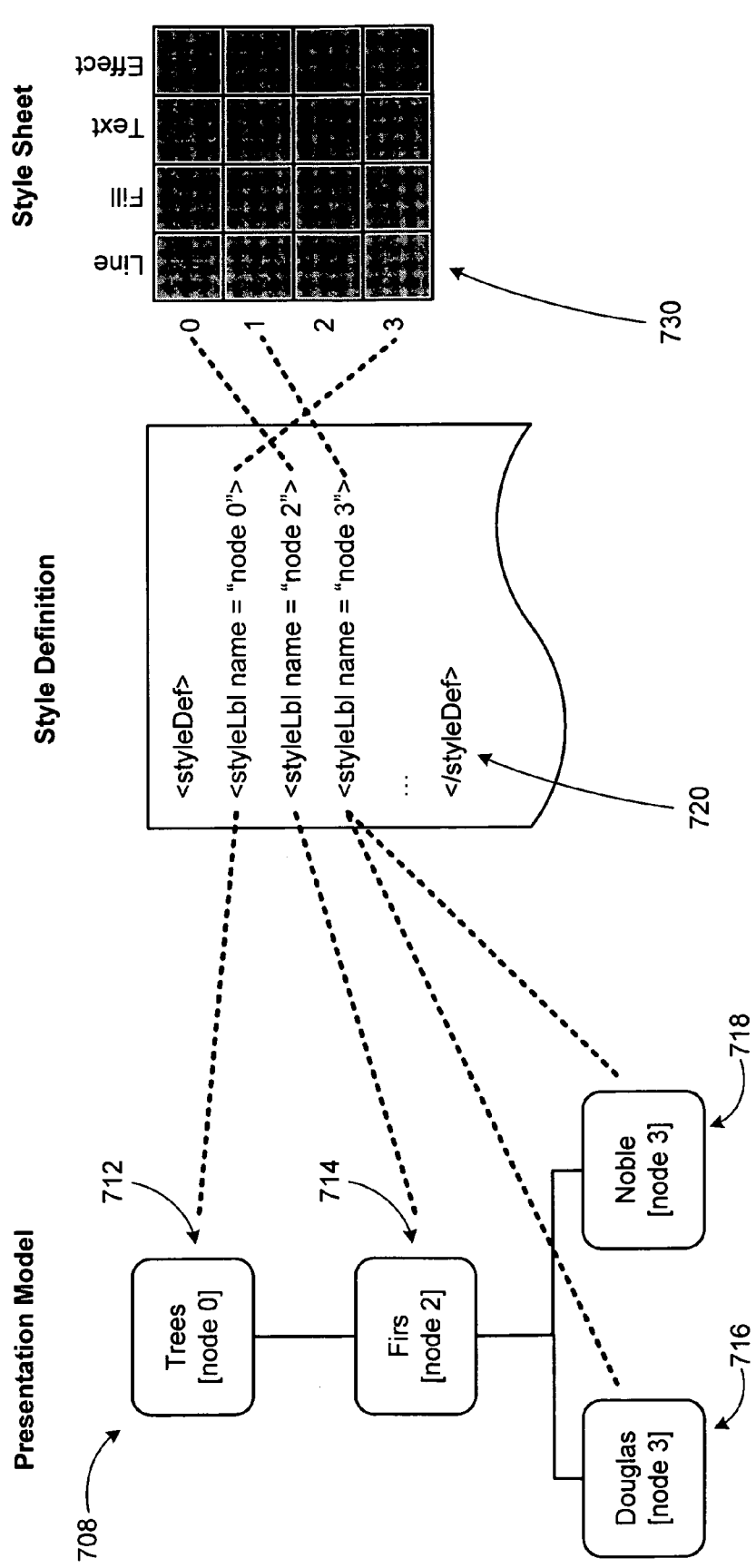
FIG. 7 illustrates assignment of style labels and style elements to key shapes in the example presentation model of FIG. 5.

FIG. 7 illustrates assignment of style labels and style elements to key shapes in the example presentation model of FIG. 5.

Objects 712, 714, 716, and 718 that were identified as node 0, node 2, and nodes 3, are assigned style properties through the style labels in style definition 720. In one embodiment, each style label may correspond to a number of properties (e.g. line, fill, and effect for objects, font, attribute, and effect for text, etc.) in a style sheet 730. For example, style label "node 0" is assigned style properties group 3 in style sheet 730. Similarly, style label "node 2" is assigned to style properties group 0 in style sheet 730. Style properties may be provided in other forms as well. Embodiments are not restricted to style sheets.

Figure 8:
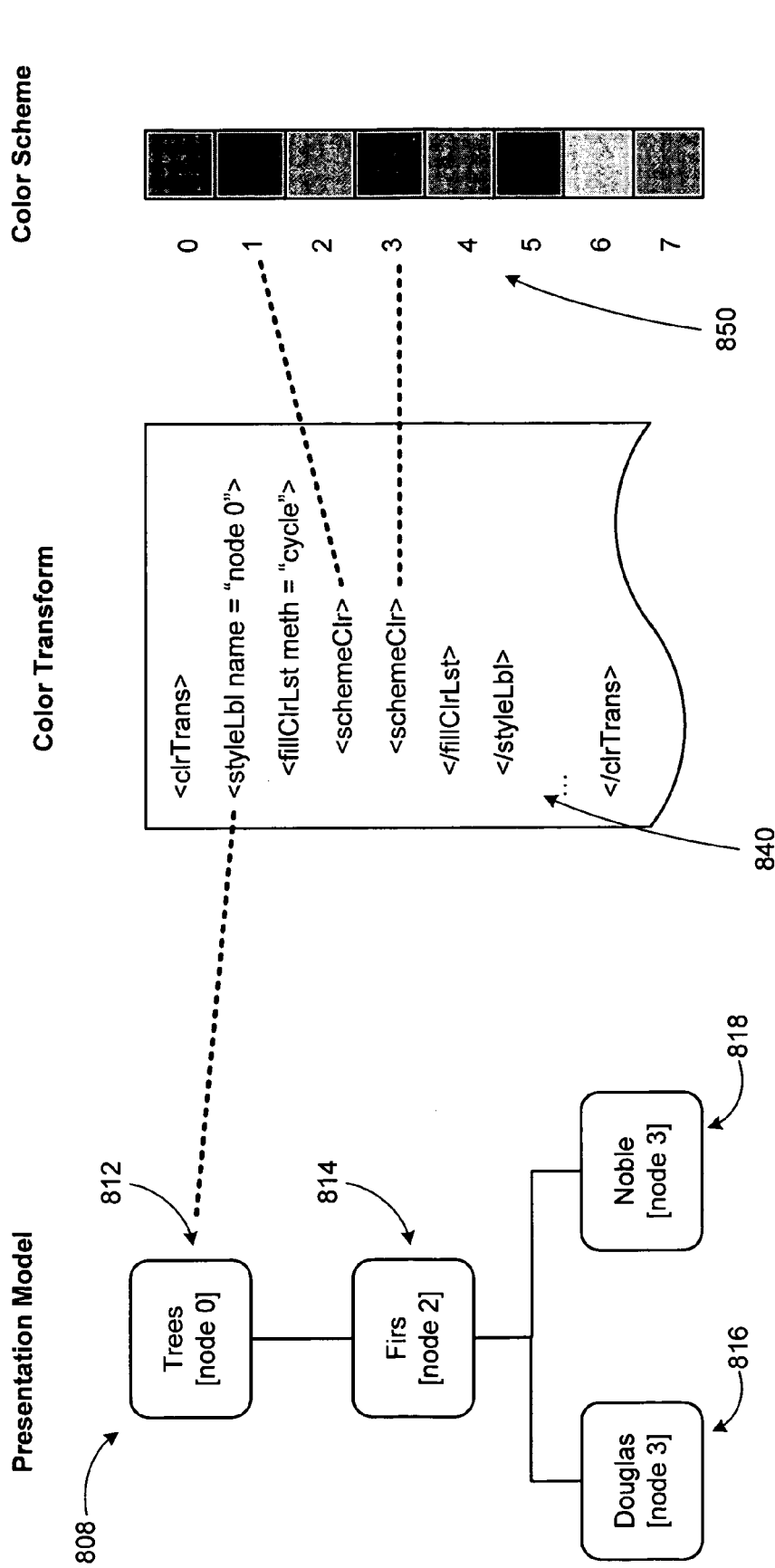
FIG. 8 illustrates assignment of color schemes to key shapes using style labels.

FIG. 8 illustrates assignment of color schemes to key shapes using style labels.

In diagram 800, color transform definition 840 is used to illustrate how objects such as object 812 are assigned a color within a color scheme (850) as part of the style label. Objects may be assigned single color, multiple colors, and different combinations of color schemes. Style labels enable preservation of color schemes independently from layout definition such that a look-and-feel of the style is maintained when layout is modified.

Furthermore, color schemes may be modified after the diagram is rendered. New color schemes may be added at any point by the user.

While example diagrams and style and color scheme definitions are shown in the above figures with limited elements, other implementations may include additional elements. Other properties, shapes, assignment types, and labels may be implemented using the principles described herein.

Figure 9:
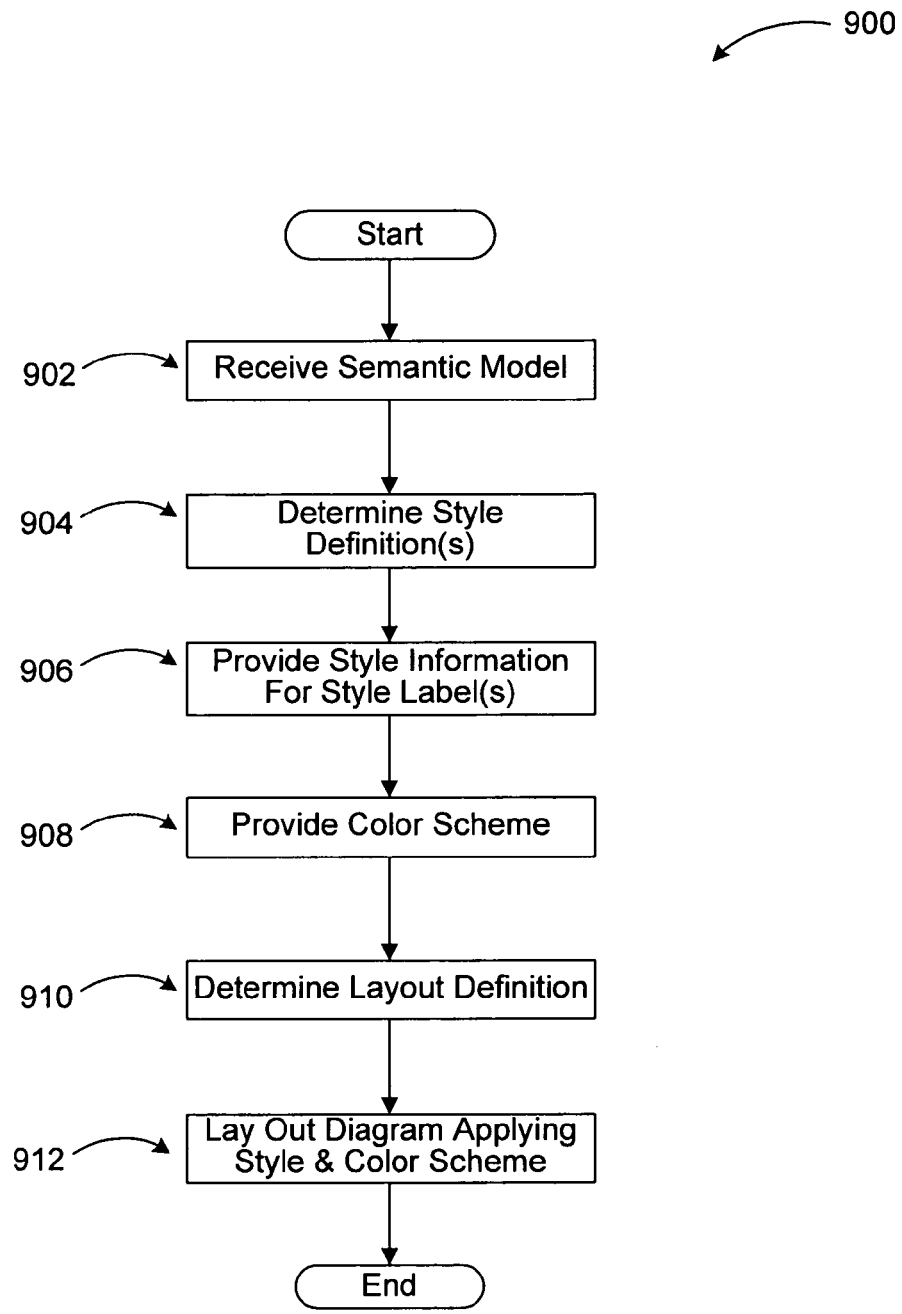
FIG. 9 illustrates a logic flow diagram for a process of providing style extensibility to a diagram.

FIG. 9 illustrates a logic flow diagram for process 900 of providing style extensibility to a diagram.

Process 900 begins at operation 902, where a semantic model is received. Relationships in a connected diagram such as a state diagram, an organizational structure diagram, and the like, may be defined in many ways. According to one embodiment, elements (objects) of the diagram and their hierarchical relationships are defined by a user employing a text-based entry method. For example, the user may enter content text for each object on a single line in a text editor. Tabs may be used to indicate hierarchical status of each entry. Connections may be based on proximity of the text-based entries (e.g. text entries in adjacent lines indicate connected objects in the diagram). Processing moves from operation 902 to operation 904.

An integral part of the diagram is the style defining how objects, connectors, and their content is presented. According to embodiments, a layout engine interacts with a style engine, which retrieves style definitions at operation 904. Processing advances from operation 904 to operation 906, where style information is provided for style labels assigned key shapes identified in the presentation model.

As described previously, the style labels are independent from the layout definition and are assigned to key shapes. The style definitions called by the style labels provide information for style properties including, but not limited to, font type, font attribute (bold, italic, underlined, etc.), shadowing, 2D/3D presentation, outlining. While a style definition may include size information for all shapes or their content for general presentation, shape-specific size information is typically included in the layout (or diagram) definition. The reason for reserving shape and content size for individual objects to the layout diagram is the size of those representing hierarchical placement of the objects in the diagram (e.g. smaller size may indicate lesser significance).

Processing advances from operation 906 to operation 908, where the color scheme is determined and provided to the layout engine. In addition to the above described example properties, style definition may also include color information for the objects (or the whole diagram). Color information may be determined by the style labels or by a separate color scheme definition. As explained in conjunction with FIG. 8, the color scheme may be provided by a color transform definition assigning colors to style labels. Processing moves from operation 908 to operation 910.

At operation 910, layout definition is determined. The layout engine of a diagram application determines layout definitions from text-based entries described above and default parameters associated with specific diagram and object types. For example, the hierarchical structure defined by the text-based user input may result in a number of different layouts depending on diagram type, such as radial, circular, tree-style, and the like. Processing advances from operation 910 to operation 912.

At operation 912, the diagram is rendered. The layout engine places objects and connectors on a canvas based on the layout (or diagram) definition(s) and user input generating a presentation model. The style and color scheme for the presentation model are implemented as provided by the style engine.

In some embodiments, the user may be provided with an opportunity to modify elements or whole style definitions. The user may even be provided with an opportunity to create their own style and apply to the diagram, because the style definitions are independent from the layout definitions. After operation 912, processing moves to a calling process for further actions.

The operations included in process 900 are for illustration purposes. Providing style extensibility to a group of shapes by editing text files may be implemented by a similar process with fewer or additional steps, as well as in different order of operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method executing on a computing device comprising a processor for providing style extensibility in a diagram, comprising:
   receiving a semantic model in the form of a text-based tree diagram of lines of text entered by a user that create and define elements in the diagram and hierarchical relationships between each of the elements of the diagram, wherein a hierarchical level for each of the elements within the diagram is based on a position of each line of text entered by the user within the semantic model, and wherein each element that is located on a different line in the semantic model is displayed as a different element within the diagram determined from the semantic model;
   assigning a style label to each of the elements of the diagram based on the hierarchical level of each of the elements within the semantic model of the defined hierarchical relationships such that each element at a same hierarchical level is assigned a same style label, wherein the style label associates the elements of the diagram with style definitions independent of a layout definition, and wherein the elements of the diagram comprise: objects, connectors and content;
   for each object of the diagram generated from the semantic model, determining a style definition by locating a matching style label within a file that comprises style definitions; and
   rendering the diagram based on the layout definition and the determined style definitions.

2. The computer-implemented method of claim 1, further comprising determining a color scheme for each object of the diagram based on a color definition, wherein the style label further associates the object with the color definition.

3. The computer-implemented method of claim 2, further comprising dynamically modifying at least one of: a style or a color scheme of the diagram by modifying the style definition and the color definition respectively.

4. The computer-implemented method of claim 1, wherein rendering the diagram includes providing a presentation model on a canvas based on the layout definition, the style definition, and the color definition for each object.

5. The computer-implemented method of claim 4, wherein the style definition includes property information for at least one of: an outline style, a fill style, a font, a text attribute, a text effect, or an outline effect associated with the object.

6. The computer-implemented method of claim 5, wherein the text attribute includes at least one of: a bold text, an italic text, an underlined text, a strike-through text; the text effect includes at least one of: a shadow effect, a 3D effect, and an embossing effect; and the outline effect includes at least one of: a shadow effect, a 3D effect, or an engraving effect.

7. The computer-implemented method of claim 1, wherein the layout definition specifies a size and a position of each object of the diagram.

8. The computer-implemented method of claim 1, wherein the semantic model includes items to be represented by the objects in the diagram such that an attribute of each item determines a hierarchical status of the associated object.

9. The computer-implemented method of claim 8, wherein the attribute of each item includes at least one of: a tab position or a line position of the item in relation to the other items in the semantic model.

10. The computer-implemented method of claim 1, wherein the style definition includes property information associated with at least one of: a text, a graphic, or an image associated with each object of the diagram.

11. The computer-implemented method of claim 1, wherein the diagram is a part of at least one of: a word processing application, a presentation application, or a spreadsheet application.

12. A system for providing style extensibility to a group of objects in a diagram based on text files, the system comprising:
   a processor and a computer storage media;
   a layout engine configured to:
     receive a semantic model in the form of a text-based tree diagram of lines of text entered by a user that is used to create and define objects to include in the diagram using the processor, wherein the semantic model defines hierarchical relationships between objects of the diagram based on a position of each line of text entered by the user within the semantic model, and wherein each line of text entered by the user in the semantic model is displayed as a different object within the diagram;
     determine an object, a connector, and a content for the object based on the semantic model and a default parameter using the processor;

determine a style definition for the object by matching an assigned style property for the object such that each object at a same hierarchical level receives a same style definition; and render a presentation model for the diagram based on the semantic model, the default parameter, and the style definition for the object; and a style engine configured to:

assign the style property to the object using a style label that is assigned to the object based on a hierarchy defined by the semantic model such that the style property can be modified independent of a layout of the object.

13. The system of claim 12, wherein the style engine is further configured to assign a color scheme property to the object independent of the style property.

14. The system of claim 12, wherein the style property includes at least one of: an outline style, a fill style, a font, a text attribute, a text effect, or an outline effect associated with the object.

15. system of claim 12, wherein the assigned style property and the color property of the object are preserved when the layout is modified.

\* \* \* \* \*